United States Patent
Menzel et al.

(10) Patent No.: US 7,927,478 B2
(45) Date of Patent: Apr. 19, 2011

(54) SPIRAL WOUND MODULE HAVING AXIAL DILUTION CHAMBER FLOW

(75) Inventors: Thomas Menzel, Pfeffingen (CH); Swen Beusshausen, Steinen (DE); Denis Stöcklin, Hegenheim (FR)

(73) Assignee: P & LS Holding GmbH, Mondsee (AT)

( * ) Notice: Subject to any disclaimer, the term of this patent is extended or adjusted under 35 U.S.C. 154(b) by 1160 days.

(21) Appl. No.: 10/557,041

(22) PCT Filed: May 13, 2004

(86) PCT No.: PCT/CH2004/000289
§ 371 (c)(1), (2), (4) Date: Dec. 14, 2006

(87) PCT Pub. No.: WO2004/101119
PCT Pub. Date: Nov. 25, 2004

(65) Prior Publication Data
US 2007/0163891 A1    Jul. 19, 2007

(30) Foreign Application Priority Data
May 17, 2003   (CH) ...................................... 0872/03

(51) Int. Cl.
*B01D 61/48*    (2006.01)
(52) U.S. Cl. ......... 204/632; 204/524; 204/533; 204/536
(58) Field of Classification Search .................. 204/524, 204/533, 536, 632
See application file for complete search history.

(56) References Cited

U.S. PATENT DOCUMENTS

| 4,225,413 | A | 9/1980 | Karn |
| 4,944,877 | A | 7/1990 | Maples |
| 5,114,582 | A | 5/1992 | Sandstrom et al. |
| 5,376,253 | A | 12/1994 | Rychen et al. |
| 2006/0169580 | A1* | 8/2006 | Grebenyuk et al. ........... 204/272 |

FOREIGN PATENT DOCUMENTS

| EP | 0 508 646 A1 | 10/1992 |
| GB | 759275 | 10/1956 |
| JP | 2000-70679 | 3/2000 |
| JP | 2000-84371 | 3/2000 |
| JP | 2001-198576 | 7/2001 |
| WO | 91/05593 | 5/1991 |

OTHER PUBLICATIONS

T. Wen et al., "Spirally wound electrodialysis (SpED) modules", Desalination, Elsevier Scientific Publishing Co, Amsterdam, NL, vol. 101, No. 1, Mar. 1, 1995, pp. 79-91, XP004019138, ISSN: 0011-9164, p. 2; figure 2.

* cited by examiner

*Primary Examiner* — Arun S Phasge
(74) *Attorney, Agent, or Firm* — Wenderoth, Lind & Ponack, L.L.P.

(57) ABSTRACT

A spiral wound module for the electrochemical desalination of aqueous salt-containing solutions, whose feeds for solution to be desalinated and whose discharge for desalinated water are mounted on side walls of the dilution chamber of the module, permits an axial instead of tangential flow in the dilution chamber.

12 Claims, 2 Drawing Sheets

SPIRAL WOUND MODULE HAVING AXIAL DILUTION CHAMBER FLOW

BACKGROUND OF THE INVENTION

I. Field of the Invention

The invention relates to a novel process for the continuous electrochemical desalination of aqueous salt-containing solutions and to a device in the form of a spiral wound module for carrying out this process.

II. Description of the Related Art

It has been known for some time that aqueous solutions can be desalinated by means of electrodialysis. In this process, ion-selective membranes are introduced between two electrodes, two membranes each, a cation-selective and an anion-selective membrane, and spacers in each case defining a dilution chamber or a concentrate chamber. An ion exchange material is often additionally introduced into these chambers. If water flows through the individual chambers, anions and cations migrate according to their charge, owing to an external electrical potential which is applied to the electrodes. Owing to the ion migration, a volume stream depleted in ions (diluate) is obtained in the dilution chamber and a volume stream enriched in ions (concentrate) is obtained in the concentrate chamber. As a rule, water-impermeable anion and cation exchange membranes are arranged alternately between the electrodes connected to a direct current source. In a particular embodiment, a dilution chamber and a concentrate chamber are spiral-wound around one of the two electrodes, the second electrode surrounding the whole wound apparatus. As a result of the wound arrangement, a dilution chamber and a concentrate chamber having an approximately spiral cross section are defined. Such wound apparatuses are referred to in the technical language as "spiral wound modules". Spiral wound modules are described, for example, in U.S. Pat. No. 4,225,413 and EP-A-O 570 341.

A disadvantage of the previously known desalination processes is that the flow inside the wound dilution chamber is tangential, i.e. along the spiral shape formed by the dilution chamber, from the outer end of the dilution chamber to its inner end (or vice versa), because, in the prior art, the feed of solution to be desalinated and the removal of the desalinated water are carried out at the inner and outer ends of the dilution chamber of the spiral wound module (or vice versa). In the dilution chamber, this results in relatively long flow distances with associated high resistances to flow.

SUMMARY OF THE INVENTION

It is the object of the present invention to provide a process for the continuous electrochemical desalination of aqueous salt-containing solutions by means of a spiral wound module, which process avoids the disadvantage mentioned.

This object is achieved by a process wherein the flow of the solution to be desalinated is effected axially through the dilution chamber of the spiral wound module.

The invention also relates to an associated spiral wound module which comprises:

a) at least one spiral-wound dilution chamber having spiral side walls and having an inner dilution chamber part; at least one spiral-wound concentrate chamber having an inner concentrate chamber part; such that the inner dilution chamber part and the inner concentrate chamber part in the wound state define an inner, axial cavity;

b) an inner electrode running in the inner axial cavity; an outer electrode surrounding the wound dilution chamber and the wound concentrate chamber;

c) a feed which is provided in one spiral side wall and is capable of feeding aqueous salt-containing solution to be desalinated into the dilution chamber; and a discharge which is provided in the other spiral side wall and is capable of discharging desalinated water from the dilution chamber; and d) a first pipe which is capable of feeding concentrate into the concentrate chamber and/or of discharging concentrate from the concentrate chamber; and a second pipe which is capable of discharging concentrate from the concentrate chamber and/or of feeding concentrate into the concentrate chamber.

DETAILED DESCRIPTION OF THE INVENTION

Figure 1:
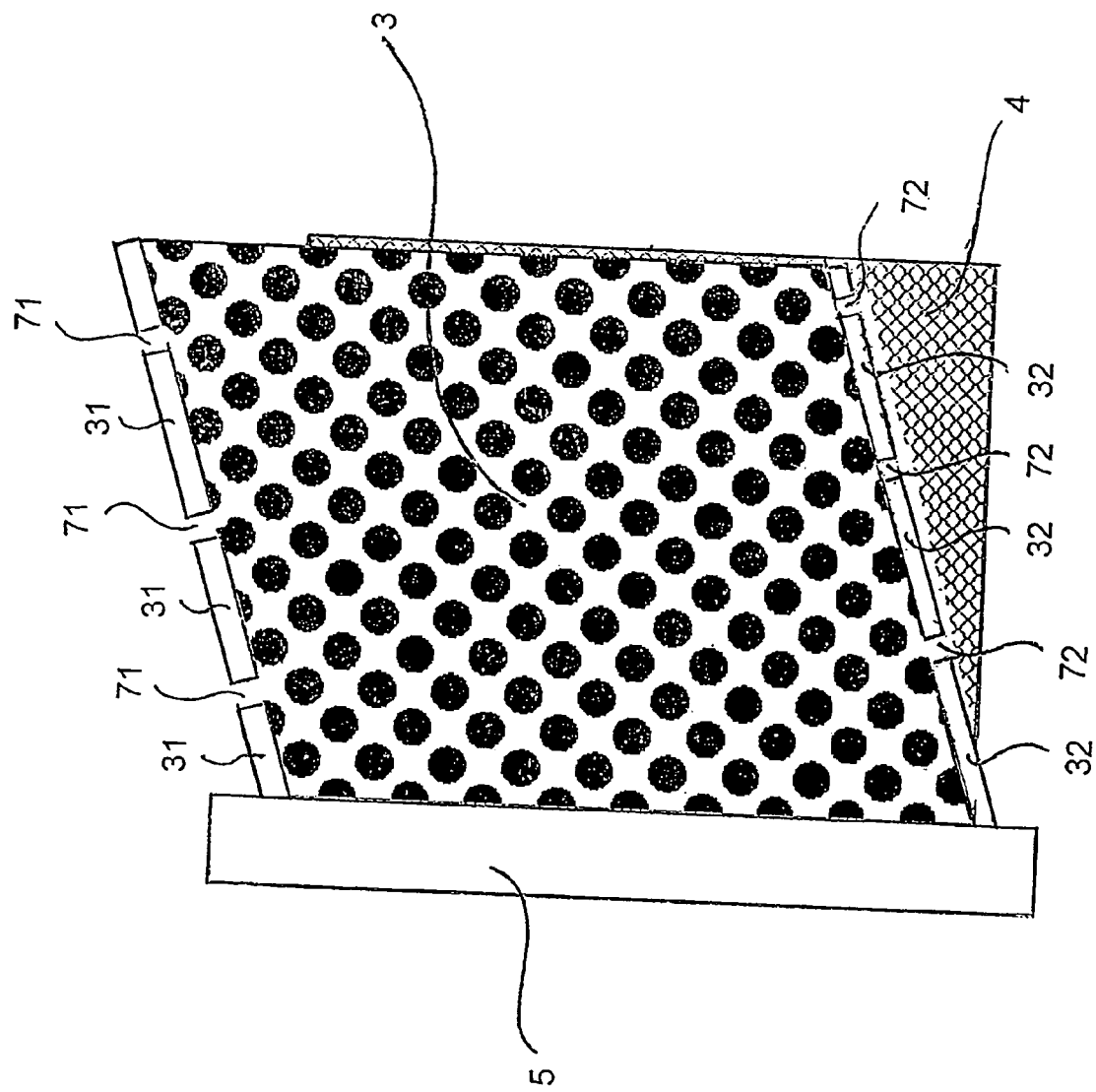
FIG. 1 shows an unwound representation of a combination of a dilution chamber and a concentrate chamber.

In the spiral wound module according to the present invention, the feed for the water to be desalinated and the discharge for the desalinated water are provided not at the outer and inner ends of the dilution chamber but in side walls of the dilution chamber (FIG. 1). This results in a flow inside the dilution chamber which takes place approximately parallel to the central axis of the spiral wound module (axially). If the wound dilution and concentrate chamber define approximately a cylindrical spiral wound module having two end faces, the flow takes place from one end face to the other end face of this cylinder. Since the flow in the concentrate chamber preferably remains tangential, this results in cross-flow of the flows of the dilution and concentrate chambers. It was found that the axial flows achievable by this arrangement, according to the invention, of the feed and discharge in the dilution chamber are much higher than the tangential flows of the dilution chamber of the previously known spiral wound modules.

The concentrate and dilution chambers (in the context of the present application, these terms have the meaning customary in the technical language) have a design similar to that which is to be found in the case of the previously known spiral wound modules. The dilution chamber is a combination of cation exchange membrane and anion exchange membrane, between which a distance is maintained which forms the internal volume of the dilution chamber. On winding the spiral wound module according to the invention, the concentrate chamber forms as an intermediate space between the windings of the above combination, it being possible, as previously known, for the distance to be maintained, for example, by means of spacers. In the finished state of the spiral wound module, the spacers may also serve for ensuring the flow and for producing turbulence, preferably over the entire area of the two chambers. Suitable spacers are, for example, plastics grids or plastics braids. Spiral wound modules according to the invention may also comprise a plurality of dilution chambers and concentrate chambers (e.g. about 2 to 4), the winding of the module according to the invention then being carried out simultaneously with the corresponding number of combinations of anion exchange membrane and cation exchange membrane (see below). The spiral wound module according to the invention can, as previously known, contain an ion exchanger in the dilution chamber and/or the concentrate chamber for improving the ion exchange and the conductivity.

Conventional ion exchange resins are suitable for this purpose, and both individual resins and mixed-bed resins may be used. Embodiments of the spiral wound module according to the invention in which ion exchange resin is present in the dilution chamber and/or the concentrate chamber are preferred. A further alternative which can be used instead of the ion exchange resin for the chambers comprises ion conductive fabrics. These are fabrics which, analogously to the ion exchangers, are subsequently derivatized with ion-exchanging groups (e.g. sulfonate, carboxYmethyl). Embodiments of the spiral wound module according to the present invention which contains such fabrics are preferred.

Concentrate can be fed to and removed from the concentrate chamber of the spiral wound module according to the invention via the first and second pipe. The direction of flow of the concentrate may be from the inside to the outside or vice versa. The concentrate serves primarily for receiving the ions released from the solution to be desalinated but may simultaneously serve as an electrode wash solution. The generally high salt concentration in the concentrate facilitates the washing out of byproducts and the optimum use of the electrodes.

According to the present invention, the thickness of the concentrate chamber can typically be about 0.3 to about 2 mm, preferably about 0.5 to about 1 mm. According to the present invention, the thickness of the dilution chamber can typically be about 3 to about 20 mm, preferably about 8 to 11 mm.

In the simplest case, only one feed may be provided for aqueous salt-containing solution to be desalinated and only one discharge for desalinated water. However, in each case a plurality of feeds and discharges per dilution chamber are preferably provided, this being more preferred in the case of a plurality of dilution chambers and concentrate chambers as well (for example about 2 to 4). If a plurality of feeds and discharges per dilution chamber is provided, the feeds and discharges can be arranged at uniform distances along the spiral side walls of the dilution chamber. If the distance a is always the same, the number of feeds and/or discharges can be determined by the formula:

$$N=(L-a)/(d+a)$$

in which formula L is the length of the dilution chamber in the unwound state, d is the diameter of the feeds or discharges, and N is the number of feeds or discharges. Particularly preferably, for example if the inwardly increasing current density is to be taken into account (this requires, in the inner part of the spiral dilution chamber, a stronger inflow of solution to be desalinated), the feeds and discharges can be arranged at distances which become increasingly small from the outside to the inside along the spiral side walls of each dilution chamber.

The interior diameter of the feed(s) and discharge(s) of the spiral wound module of the present invention may typically lie in the range of about 1 to about 5 mm, preferably it is about 2 mm.

The inner electrode arranged in the inner cavity and the outer electrode preferably have approximately the shape of a cylinder and hollow cylinder, respectively. The electrodes may consist of the materials customary in the case of spiral wound modules. Preferred anode materials are graphite and noble metal-coated titanium steel, and DSA anodes (mixed oxide anodes) are also possible; preferred cathode material is stainless steel. It is generally of no importance for the desalination process according to the invention whether the inner electrode is chosen as the anode and the outer electrode as the cathode or the inner electrode as the cathode and the outer electrode as the anode. The inner electrode may be solid or hollow, in the latter case it preferably being filled with a suitable material, for example a plastic, such as polyvinyl chloride, polyethylene, polypropylene, ABS, polyoxyethylene or polyphenylene oxide.

The entire spiral wound module according to the invention is preferably surrounded by a reinforced plastics casing so that it appears as a closed pipe from the outside and is pressure-resistant. This can be effected, for example, in such a way that the entire spiral wound module is cast in a preferably cylindrical epoxy resin block. All required connections and pipes are cast directly in this resin block, it being possible for the exit of these connections and pipes from the block to be freely determined beforehand.

The production of the spiral wound module according to the invention can be effected, for example, as follows:

a) The ends of a web of cation exchange membrane and a web of anion exchange membrane are adhesively bonded to one another or, if the matrix polymers of the membranes consist of a thermoplastic, preferably welded to one another by means of the same plastic. The ends can also be placed in a holding block in which a suitable groove was milled beforehand and the groove can be adhesively bonded to the membranes fitted therein. This end to which the two membrane webs are connected to one another is fitted into an axial recess in an inner electrode, which, for example, is rod-shaped, and is fastened therein, said recess having an interlocking fit. Furthermore, an axial groove into which a pipe having an approximately slot-shaped bore is fitted is provided beforehand in the inner electrode (this second pipe subsequently serves for feeding concentrate into the inner concentrate chamber part or for discharging concentrate therefrom).

b) The two membranes are then wound around the inner electrode with the use of spacers or ion exchangers or ion-conductive fabrics between them. This combination of two membranes and the spacers located in between defines the subsequent dilution chamber. Each new wound-on winding of the combination of membranes and spacers in between is held by means of further spacers at a defined distance from that winding of the combination which is located underneath. For the first winding of the combination, a suitable distance of this first winding from the surface of the inner electrode is ensured by means of spacers. This innermost distance represents the first winding of the concentrate chamber, which is in conductive contact with the inner electrode (i.e. the inner concentrate chamber part). The intermediate spaces produced by means of spacers and present between the individual windings of the combination and between the first winding of the combination and the surface of the inner electrode define the main part of the subsequent concentrate chamber.

c) Once a sufficient, freely selectable number of wound-on windings of the combination has been achieved, the free ends of cation exchange membrane and anion exchange membrane are connected to one another in a manner similar to that already described above under a). The closed end (i.e. the now closed outer dilution chamber part) is fastened axially to an outer electrode approximately in the form of a hollow cylinder, if necessary with the use of a sealing material and/or locking means. The internal diameter of this electrode is slightly greater than the external diameter of the outermost winding. The distance in between can in turn, if desired, be fixed by means of spacers and defines the outermost winding of the concentrate chamber (i.e. the outer concentrate chamber part), which is in conductive contact with the outer electrode. An axial pipe which may have an approximately slot-shaped bore is laid into this latter distance (this first pipe subsequently serves for introducing concentrate into the outer concentrate chamber part or for discharging concentrate therefrom).

d) The end faces of the spiral wound module which are still open after winding can be closed by immersion in liquid synthetic resin and curing thereof. Synthetic resins, such as polyurethanes, epoxy resins, polyesters and the like, are suitable here. The dilution chamber and the concentrate chamber are closed thereby with formation of side walls. The resulting side walls of dilution and concentrate chamber have, in profile, approximately the shape of a spiral. For the production of the side walls, flexible rectangular profiles (e.g. of EPDM rubber) can also be used during the winding of the spiral wound module, which profiles are then incorporated into the winding. These profiles can be provided beforehand with feeds or discharges, for example by means of bores. A further possibility is the use of flexible rectangular profiles of sintered material when winding the module. Since the sintered material already contains pores, the explicit application of feeds or discharges is superfluous here.

For producing the feeds for solution to be desalinated into the dilution chamber and the discharges for discharging desalinated water from the dilution chamber, a suitable number of bores can be applied along the entire spiral length of the side walls which close the dilution chamber, on both end faces. The axial flow inside the dilution chamber can, as is known in the industry, also be optimized by means of distribution systems which distribute as well as possible the solution to be desalinated or the desalinated water directly at the feed or discharge, respectively. The distribution systems also prevent the ion exchange resin from being washed out if its particle size is less than the diameter of the discharges.

Spiral wound modules according to the invention can also be simultaneously wound with a plurality of above-described combinations of the cation exchange membrane, the anion exchange membrane and spacers (for example about 2 to 4). The beginning of each combination, produced as described above, can be anchored at regular intervals on the surface of the inner electrode, as described above. For each combination, a groove for an associated second pipe for concentrate is provided in the inner electrode. Similarly, the termination of the winding for each combination is effected separately, as described above for the production process with one combination.

In all cases where spacers are used, a filling of an ion exchanger can be used instead or additionally.

FIG. 1 shows an unrolled combination of a dilution chamber and a concentrate chamber as used in the spiral wound module according to the invention. The dilution chamber 3 is shown in perspective slightly raised relative to the concentrate chamber 4. The dilution chamber 3 has two side walls (31, 32) which will point toward the end faces of the wound module. The filling of the dilution chamber 3 with black circles indicates a filling with spacers and/or with ion exchange resin. The dilution chamber 3 has, in one side wall 31, three feeds 71 for salt-containing solution to be desalinated and, in the other side wall 32, three discharges 72 for desalinated water. In the concentrate chamber, a filling with spacers and/or ion exchange resin is likewise indicated by means of the pattern. It is also shown that the two chambers are fastened to the inner electrode 5 prior to winding.

Figure 2:
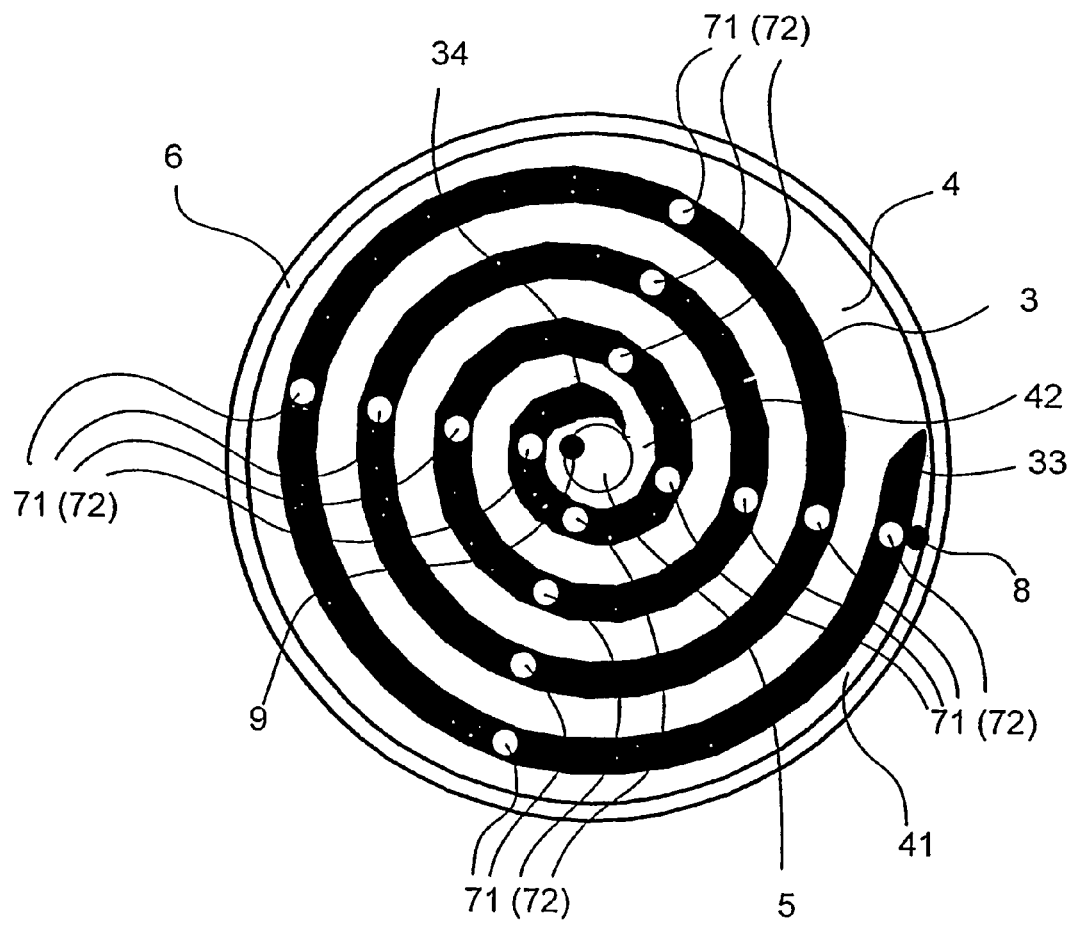
FIG. 2 shows a lateral cut-away representation of a spiral wound module according to the invention, but the feeds and discharges for the dilution chamber are also indicated.

FIG. 2 shows a sectional diagram through a spiral wound module according to the invention, but the position of the plurality of feeds 71 which supply the dilution chamber 3 with aqueous solution to be desalinated is additionally shown by way of illustration (they could also be the discharges 72). The dilution chamber 3 is shown as a black spiral; the concentrate chamber 4 is shown as a white spiral. For supplying the concentrate chamber 4, the first pipe 8 in the vicinity of the outer electrode 6 and the inner pipe 9 in the vicinity of the inner electrode 5 (both shown as small black circles) are shown. The positions of the inner dilution chamber part 34 and inner concentrate chamber part 42, and the position of the outer dilution chamber part 33 and the outer concentrate chamber part 41 are also shown. It can be seen that the spacings of the feed 71 (or discharges 72) are present at intervals which become increasingly small along the spiral side walls (without reference numerals here) in an inward direction. Here, the feeds and discharges are to be understood as lying pairwise one behind the other (as eclipsing each other). However, this is not essential to the invention and it may even be preferable to mount the feeds offset relative to the discharges on the two side walls.

The present invention also relates to a desalination process using the spiral wound module according to the invention. The electrochemical desalination process, which can be carried out by means of the spiral wound module according to the invention, is analogous to the desalination process with previously known spiral wound modules, except that the aqueous solution to be desalinated is fed in laterally and the desalinated water is discharged laterally. The process may be an electrodialysis (if ion exchange resin is present neither in dilution chamber nor in concentrate chamber) or it may be an electrodiaresis (if ion exchange resin is present in the dilution chamber and/or the concentrate chamber).

The spiral wound module according to the invention has a much smaller pressure drop in the dilution chamber and therefore permits much higher flows in desalination operation. The spiral wound module according to the invention permits the desalination of aqueous solution also at relatively high hydraulic performances. Thus, in the case of a spiral wound module of length of about 0.80 to about 1.20 m, preferably about 1 m, and of a diameter of about 20 to about 30 cm, preferably about 26 cm, it is a preferred embodiment of the process of the invention to feed to the spiral wound module salt-containing solution to be desalinated at a flow of about 2.5 to about 3.3 cubic meters per hour, preferably about 3 cubic meters per hour, over the feed (71) (if the spiral wound module has several dilution chambers (3) with one feed (71) each, or with several feeds (71) each, over the total number of feeds (71)). As the "length" of the spiral wound module is understood here the distance from the one face formed by the one side wall(s) (31) to the other face formed by the other sidewall(s) (32). As the "diameter" of the spiral wound module is understood the outer diameter of the outmost winding(s) of the concentrate chamber(s) (4); as this is (these are) in electrically conducting contact with the outer electrode (6), this diameter is, when using a cylindrical outer electrode (6), equal to the interior diameter of the outer electrode (6). Because an inner pipe for the dilution chamber is no longer required in the spiral wound module according to the invention, that proportion of the area of the inner electrode which may be electrochemically active increases. In the case of the previously known spiral wound modules, a part of this electrochemically active area is lost owing to the presence of the second inner pipe which supplies the dilution chamber and which has to rest on the surface of the inner electrode.

The invention claimed is:

1. A spiral wound module for electrochemical desalination of aqueous salt-containing solutions, said spiral wound module comprising:
   at least one spiral-wound dilution chamber having first and second spiral side walls and having an inner dilution chamber part;
   at least one spiral-wound concentrate chamber having an outer concentrate chamber part and an inner concentrate chamber part, such that said inner dilution chamber part and said inner concentrate chamber part in a wound state define an inner, axial cavity;
   an inner electrode extending in said inner, axial cavity;
   an outer electrode surrounding said spiral-wound dilution chamber and said spiral-wound concentrate chamber;
   a plurality of feeds disposed in said first spiral side wall and configured to feed aqueous salt-containing solution to be desalinated into said spiral-wound dilution chamber;
   a plurality of discharges disposed in the said second spiral side wall and configured to discharge desalinated aqueous solution from said spiral-wound dilution chamber;
   a first conduit capable of at least one of feeding concentrate into said outer concentrate chamber part and discharging concentrate from said outer concentrate chamber part; and
   a second conduit capable of at least one of discharging concentrate from said inner concentrate chamber part and feeding concentrate into said inner concentrate chamber part,
   wherein said outer concentrate chamber part is formed from an outermost winding of said spiral-wound concentrate chamber, in said outermost winding of said spiral-wound concentrate chamber, a distance to said outer electrode is formed by spacers, and said outer concentrate chamber part is in conductive contact with said outer electrode, and
   wherein said inner concentrate chamber part is formed of a first winding of said spiral-wound concentrate chamber, in said first winding of said spiral-wound concentrate chamber, a distance to a surface of said inner electrode is formed by spacers and said inner concentrate chamber part is in conductive contact with said inner electrode.

2. The spiral wound module as claimed in claim 1, wherein said at least one spiral-wound dilution chamber includes a plurality of spiral-wound dilution chambers, and said at least one spiral-wound concentrate chambers includes an identical number of concentrate chambers as the number of the plurality of spiral-wound dilution chambers.

3. The spiral wound module as claimed in claim 1, wherein the feeds of said plurality of feeds are arranged at equal distances along the spiral shape of said first spiral side wall and wherein the discharges of said plurality of discharges are arranged at equal distances along the spiral shape of the said second spiral side wall.

4. The spiral wound module as claimed in claim 3, wherein in at least one of a number N of feeds with circular cross-section is disposed in said first spiral side wall and a number N of discharges with circular cross-section is disposed in said second spiral side wall, whereby the number N is determined by the formula:

$$N=(L-a)/(d+a)$$

in which formula L is the length of the first and second spiral side walls in an unwound state of said spiral-wound dilution chamber, a is at least one the distance between said feeds along said first spiral side wall and the distance between the discharges along said second spiral side wall, and d is at least one of the diameter of said feeds and of said discharges.

5. The spiral wound module as claimed in claim 1, wherein said feeds are arranged along the spiral shape of said first spiral side wall at distances which decrease toward the inside of said spiral wound module, and wherein said discharges are arranged along the spiral shape of said second spiral side wall at distances which decrease toward the inside of said spiral wound module.

6. The spiral wound module as claimed in claim 1, wherein said feeds and (72) said discharges are drilled holes in said first and second spiral side walls, respectively.

7. The spiral wound module as claimed in claim 1, wherein the said spiral-wound dilution chamber comprises an ion exchange resin.

8. The spiral wound module as claimed in claim 1, wherein the said spiral-wound concentrate chamber comprises an ion exchange resin.

9. The spiral wound module as claimed in claim 1, wherein the said spiral-wound dilution chamber comprises an ion-conductive fabric.

10. The spiral wound module as claimed in claim 1, wherein the said spiral-wound concentrate chamber comprises an ion-conductive fabric.

11. A process for desalination of an aqueous salt-containing solution using the spiral wound module as claimed in claim 1, said method comprising simultaneously:
    feeding an aqueous salt-containing solution to be desalinated by the feeds to the spiral-wound dilution chamber;
    feeding concentrate by said first conduit into said outer concentrate chamber part and discharging the concentrate by the second conduit from the inner concentrate chamber, or feeding concentrate by the second conduit into the inner concentrate chamber and removing the concentrate by the first conduit from the outer concentrate chamber;
    applying a DC potential which is capable of producing an electrochemical current in the spiral wound module to the inner and outer electrodes; and
    discharging desalinated aqueous solution by the discharges from the spiral-wound dilution chamber.

12. The spiral wound module as claimed in claim 1, wherein said first and second spiral side walls, comprise rectangular profiles.

* * * * *